United States Patent
McCaffrey et al.

(10) Patent No.: US 10,337,346 B2
(45) Date of Patent: Jul. 2, 2019

(54) BLADE OUTER AIR SEAL WITH FLOW GUIDE MANIFOLD

(71) Applicant: United Technologies Corporation, Farmington, CT (US)

(72) Inventors: Michael G. McCaffrey, Windsor, CT (US); Benjamin F. Hagan, Winston-Salem, NC (US); David Richard Griffin, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 636 days.

(21) Appl. No.: 15/071,281

(22) Filed: Mar. 16, 2016

(65) Prior Publication Data

US 2017/0268362 A1    Sep. 21, 2017

(51) Int. Cl.
   *F01D 11/08*    (2006.01)
   *F01D 11/02*    (2006.01)
   (Continued)

(52) U.S. Cl.
   CPC .............. *F01D 11/08* (2013.01); *F01D 9/065* (2013.01); *F01D 11/001* (2013.01); *F01D 11/02* (2013.01);
   (Continued)

(58) Field of Classification Search
   CPC ........ F01D 11/08; F01D 25/12; F01D 11/001; F01D 11/02; F01D 9/065; F01D 11/005; F01D 11/006; F01D 11/12; F01D 11/14; F01D 11/18; F01D 11/20; F01D 11/24; F02C 7/28; F05D 2240/11; F05D 2300/10; F05D 2240/55; F05D 2220/32; F05D 2260/201; Y02T 50/672; Y02T 50/675
   See application file for complete search history.

(56) References Cited

U.S. PATENT DOCUMENTS 4,087,199 A * 5/1978 Hemsworth ............ F01D 11/08
                                              415/173.3
4,303,371 A * 12/1981 Eckert .................... F01D 11/08
                                              415/116
(Continued)

FOREIGN PATENT DOCUMENTS

EP    0893577    1/1990
EP    2546471    1/2013
(Continued)

OTHER PUBLICATIONS

European Search Report for European Patent Application No. 17160062 completed Aug. 7, 2017.

*Primary Examiner* — Eldon T Brockman
(74) *Attorney, Agent, or Firm* — Carlson, Gaskey & Olds, P.C.

(57) ABSTRACT

A blades outer air seal includes a seal arc segment that defines radially inner and outer sides. The radially outer side includes radially-extending sidewalls and a radially inner surface that joins the radially-extending sidewalls. The radially-extending sidewalls and the radially inner surface define a pocket. A manifold is disposed at least partially in the pocket. The manifold subdivides the pocket such that there is a manifold chamber bounded by the manifold and the radially inner surface. The manifold includes at least one inlet and a plurality of outlets.

16 Claims, 4 Drawing Sheets

(51) Int. Cl.
  F01D 25/12 (2006.01)
  F01D 9/06 (2006.01)
  F01D 11/00 (2006.01)
  F02C 7/28 (2006.01)
  F01D 11/24 (2006.01)

(52) U.S. Cl.
  CPC ............... F01D 25/12 (2013.01); F02C 7/28 (2013.01); F01D 11/24 (2013.01); F05D 2220/32 (2013.01); F05D 2240/11 (2013.01); F05D 2240/55 (2013.01); F05D 2260/201 (2013.01); F05D 2300/10 (2013.01); Y02T 50/672 (2013.01); Y02T 50/675 (2013.01)

(56) References Cited

U.S. PATENT DOCUMENTS

| | | | |
|---|---|---|---|
| 4,513,567 A | 4/1985 | Deveau et al. | |
| 4,527,385 A | 7/1985 | Jumelle et al. | |
| 4,728,257 A | 3/1988 | Handschuh | |
| 5,609,469 A | 3/1997 | Worley et al. | |
| 5,639,210 A | 6/1997 | Carpenter et al. | |
| 5,964,575 A * | 10/1999 | Marey | F01D 25/12 415/115 |
| 6,142,731 A | 11/2000 | Dewis et al. | |
| 6,431,825 B1 | 8/2002 | McLean | |
| 6,726,448 B2 | 4/2004 | McGrath et al. | |
| 6,733,235 B2 | 5/2004 | Alford et al. | |
| 6,997,673 B2 * | 2/2006 | Morris | F01D 9/04 415/1 |
| 7,052,235 B2 | 5/2006 | Alford et al. | |
| 7,163,206 B2 | 1/2007 | Cross et al. | |
| 7,435,049 B2 | 10/2008 | Ghasripoor et al. | |
| 7,527,472 B2 | 5/2009 | Allen | |
| 7,665,962 B1 | 2/2010 | Liang | |
| 7,959,407 B2 | 6/2011 | Tholen | |
| 8,123,466 B2 | 2/2012 | Pietraszkiewicz et al. | |
| 8,303,247 B2 | 11/2012 | Schlichting et al. | |
| 8,439,636 B1 | 5/2013 | Liang | |
| 8,534,995 B2 | 9/2013 | McCaffrey | |
| 8,568,091 B2 | 10/2013 | McCaffrey | |
| 8,585,357 B2 | 11/2013 | DiPaola et al. | |
| 8,596,963 B1 | 12/2013 | Liang | |
| 8,790,067 B2 | 7/2014 | McCaffrey et al. | |
| 8,876,458 B2 | 11/2014 | Thibodeau et al. | |
| 8,920,127 B2 | 12/2014 | McCaffrey | |
| 8,944,756 B2 * | 2/2015 | Lagueux | F01D 11/22 415/113 |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 9,506,369 B2 * | 11/2016 | Boswell | F01D 11/24 |
| 2005/0129499 A1 * | 6/2005 | Morris | F01D 9/04 415/1 |
| 2006/0038358 A1 | 2/2006 | James | |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2010/0226760 A1 | 9/2010 | McCaffrey | |
| 2011/0044803 A1 | 2/2011 | Di Paola et al. | |
| 2011/0044804 A1 | 2/2011 | DiPaola et al. | |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0017060 A1 * | 1/2013 | Boswell | F01D 11/24 415/1 |
| 2013/0022469 A1 | 1/2013 | McCaffrey | |
| 2013/0113168 A1 | 5/2013 | Lutjen et al. | |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0116059 A1 * | 5/2014 | Benz | F23M 5/085 60/754 |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2015/0016954 A1 | 1/2015 | Thibodeau et al. | |
| 2015/0031764 A1 | 1/2015 | Kraus et al. | |
| 2015/0226132 A1 | 8/2015 | Thill et al. | |
| 2015/0337672 A1 | 11/2015 | McCaffrey et al. | |
| 2015/0369076 A1 | 12/2015 | McCaffrey et al. | |
| 2016/0003078 A1 | 1/2016 | Stevens et al. | |
| 2016/0003080 A1 | 1/2016 | Mcgarrah | |

FOREIGN PATENT DOCUMENTS

| | | |
|---|---|---|
| WO | 2015038906 | 3/2015 |
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

* cited by examiner

```
┌─────────────────────────┐
│ PROVIDE SEAL ARC SEGMENT│──202
└────────────┬────────────┘
             │
┌────────────▼────────────┐
│  INSERT MANIFOLD AT LEAST│
│  PARTIALLY INTO POCKET IN│──204
│     SEAL ARC SEGMENT     │
└─────────────────────────┘
```

BLADE OUTER AIR SEAL WITH FLOW GUIDE MANIFOLD

BACKGROUND

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY

A seal assembly according to an example of the present disclosure includes a seal arc segment defining radially inner and outer sides. The radially outer side includes radially-extending sidewalls and a radially inner surface joining the radially-extending sidewalls. The radially-extending sidewalls and the radially inner surface define a pocket. A manifold is disposed at least partially in the pocket. The manifold subdivides the pocket such that there is a manifold chamber bounded by the manifold and the radially inner surface. The manifold includes at least one inlet and a plurality of outlets.

In a further embodiment of any of the foregoing embodiments, the manifold subdivides the pocket into the manifold chamber and a manifold exhaust chamber that is radially outwards of the manifold chamber.

In a further embodiment of any of the foregoing embodiments, the plurality of outlets open into the manifold exhaust chamber.

In a further embodiment of any of the foregoing embodiments, the manifold exhaust chamber is bounded, exclusive of the radially inner surface, by the manifold and the radially-extending sidewalls.

The seal assembly as recited in claim 4, further comprising a heat shield that lines the radially-extending sidewalls of the manifold exhaust chamber.

In a further embodiment of any of the foregoing embodiments, the at least one inlet is flared.

The seal assembly as recited in claim 1, further comprising a seal disposed between the radially-extending sidewalls and the manifold.

In a further embodiment of any of the foregoing embodiments, the seal is contiguous with the radially inner surface.

In a further embodiment of any of the foregoing embodiments, the manifold includes a peripheral seal groove, and the seal is partially disposed in the peripheral seal groove.

In a further embodiment of any of the foregoing embodiments, the manifold includes at least one flow guide that protrudes into the manifold chamber.

In a further embodiment of any of the foregoing embodiments, the seal arc segment is formed of a ceramic material and the manifold is formed of a metallic alloy.

In a further embodiment of any of the foregoing embodiments, the manifold is non-destructively removable from the pocket and the seal arc segment.

A gas turbine engine according to an example of the present disclosure includes a rotor section that has a rotor having a plurality of blades and at least one annular seal system circumscribing the rotor. The annular seal system includes a plurality of seal arc segments and a corresponding plurality of manifolds arranged with the seal arc segments. Each of the seal arc segments defines radially inner and outer sides. The radially outer side includes radially-extending sidewalls and a radially inner surface joining the radially-extending sidewalls. The radially-extending sidewalls and the radially inner surface define a pocket. The corresponding manifold is disposed at least partially in the pocket. The manifold subdivides the pocket such that there is a manifold chamber bounded by the manifold and the radially inner surface. The manifold includes at least one inlet and a plurality of outlets.

In a further embodiment of any of the foregoing embodiments, the manifold subdivides the pocket into the manifold chamber and a manifold exhaust chamber that is radially outwards of the manifold chamber, and the plurality of outlets open into the manifold exhaust chamber.

A further embodiment of any of the foregoing embodiments includes, a heat shield that lines the radially-extending sidewalls of the manifold exhaust chamber.

A further embodiment of any of the foregoing embodiments includes, a seal disposed between the radially-extending sidewalls and the manifold.

In a further embodiment of any of the foregoing embodiments, the seal arc segment is formed of a ceramic material and the manifold is formed of a metallic alloy.

In a further embodiment of any of the foregoing embodiments, the manifold is non-destructively removable from the pocket and the seal arc segment.

A method of assembling a blade outer air seal according to an example of the present disclosure includes providing a seal arc segment that defines radially inner and outer sides. The radially outer side includes radially-extending sidewalls and a radially inner surface joins the radially-extending sidewalls. The radially-extending sidewalls and the radially inner surface define a pocket insert a manifold at least partially in the pocket. The manifold subdivides the pocket such that there is a manifold chamber bounded by the manifold and the radially inner surface. The manifold includes at least one inlet and a plurality of outlets.

A further embodiment of any of the foregoing embodiments includes, prior to the inserting, removing the manifold from another, different seal arc segment.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
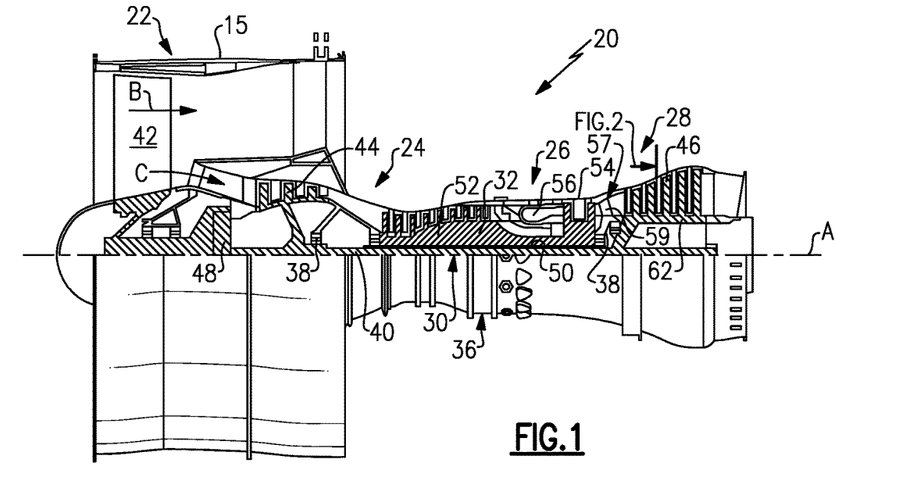
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
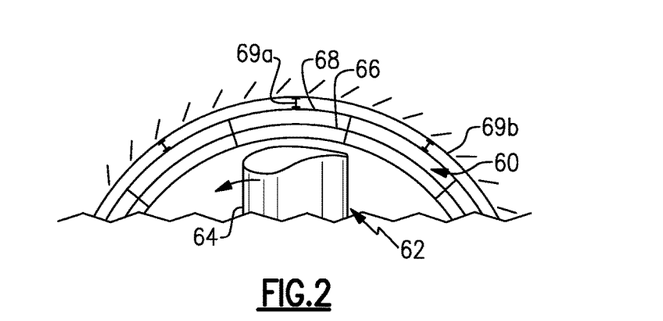
FIG. 2 illustrates an axial view of a seal assembly of a gas turbine engine.

FIG. 2 illustrates a partial axial view through a portion of one of the stages of the turbine section 28. In this example, the turbine section 28 includes an annular blade outer air seal (BOAS) system or assembly 60 (hereafter BOAS 60) that is located radially outwards of a rotor 62 that has a row of rotor blades 64. As can be appreciated, the BOAS 60 can alternatively or additionally be adapted for other portions of the engine 20, such as the compressor section 24.

The BOAS 60 includes a plurality of seal arc segments 66 that are circumferentially arranged in an annulus around the central axis A of the engine 20. The seal arc segments 66 are mounted in a carriage 68, which may be continuous or segmented. The carriage 68 is mounted through one or more connections 69a to a case structure 69b. The BOAS 60 is in close radial proximity to the tips of the blades 64, to reduce the amount of gas flow that escapes around the blades 64.

Figure 3:
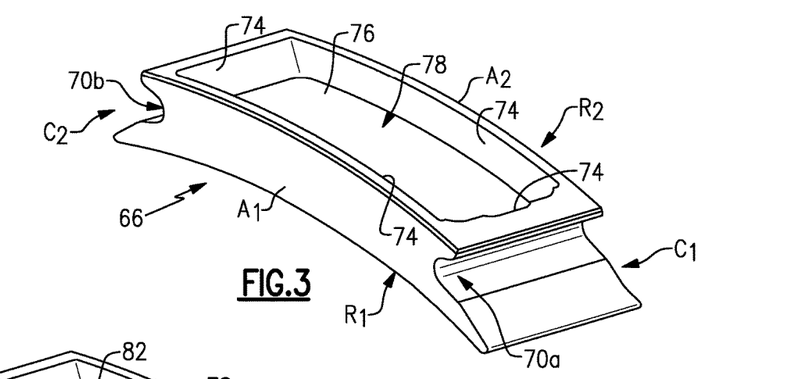
FIG. 3 illustrates an isolated view of a seal arc segment of a seal assembly.
Figure 4:
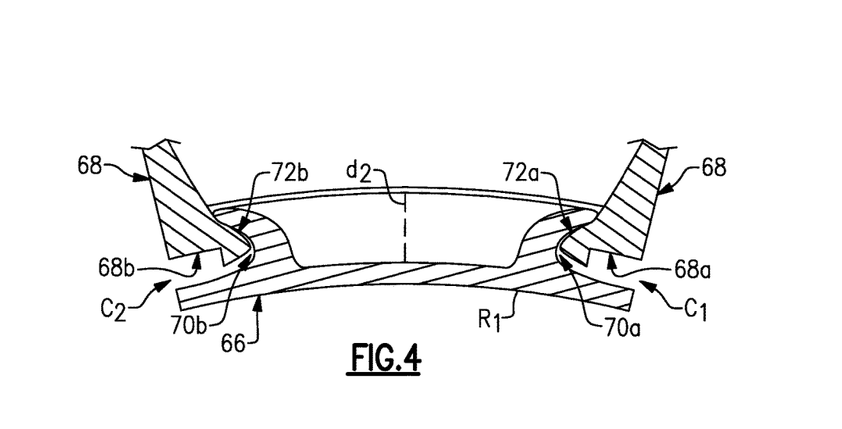
FIG. 4 illustrates a seal arc segmented mounted in a carriage.

FIG. 3 illustrates an isolated view of a representative one of the seal arc segments 66, and FIG. 4 illustrates a view of the seal arc segment 66 mounted in a portion of the carriage 68. As will be appreciated, the examples herein may be used to provide compliant, low-stress mounting of the seal arc segment 66 in the carriage 68. In particular such compliant low-stress mounting may be useful for seal arc segments 66 formed of materials that are sensitive to stress concentrations, although this disclosure is not limited and other types of seals and materials will also benefit.

Although not limited, the seal arc segments 66 (i.e., the body thereof) may be monolithic bodies that are formed of a high thermal-resistance, low-toughness material. For example, the seal arc segments 66 may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). Alternatively, the seal arc segments 66 may be formed of high-toughness material, such as but not limited to metallic alloys.

Each seal arc segment 66 is a body that defines radially inner and outer sides R1/R2, first and second circumferential ends C1/C2, and first and second axial sides A1/A2. The radially inner side R1 faces in a direction toward the engine central axis A. The radially inner side R1 is thus the gas path side of the seal arc segment 66 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In this example, the first and second circumferential ends C1/C2 define, respectively, first and second seal supports 70a/70b by which the carriage 68 radially supports or suspends the seal arc segment 66. The seal arc segment 66 is thus end-mounted. In the example shown, the first and second seal supports 70a/70b have a dovetail geometry.

The carriage 68 includes first and second support members 68a/68b that serve to radially support the seal arc segment 66 via, respectively, the first and second seal supports 70a/70b. In the example shown, the first and second support members 68a/68b are hook supports that interfit with the dovetail geometry of the first and second seal supports 70a/70b.

The first support member 68a supports the seal arc segment 66 in a first ramped interface 72a and the second support member 68b supports the seal arc segment 66 in a second ramped interface 72b. For instance, each of the ramped interfaces 72a/72b includes at least one ramped surface on the seal arc segment, the carriage 68, or both. In the example shown, the surfaces of the first and second seal supports 70a/70b and the surfaces of the first and second support members 68a/68b are ramped. The term "ramped" as used herein refers to a support surface that is sloped with respect to both the radial and circumferential directions.

The ramped interfaces 72a/72b permit the seal arc segment 66 to move circumferentially with respect to the carriage 68 as the seal arc segment 66 slides up and down the ramped interfaces 72a/72b. Friction in the ramped interfaces 72a/72b during sliding movement can potentially provide damping, and the relatively large contact area across the ramped interfaces 72a/72b distributes loads transferred through the ramped interfaces 72a/72b, which also serves to potentially reduce stress concentrations on the seal arc segment 66.

The radially outer side R2 of the seal arc segment 66 includes radially-extending rails or sidewalls 74 (FIG. 3) and a radially inner or innermost surface 76 that joins the sidewalls 74. The sidewalls 74 and the radially inner surface 76 define a pocket 78 on the radially outer side R2 of the seal arc segment 66. In this example, the pocket 78 is open on its radially outer side.

Figure 5:
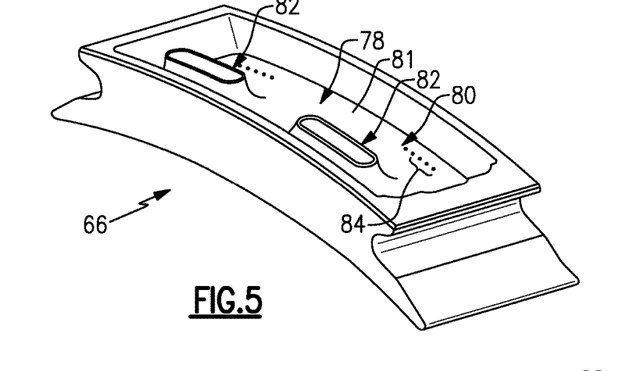
FIG. 5 illustrates a seal arc segment with an inserted manifold.
Figure 6A:
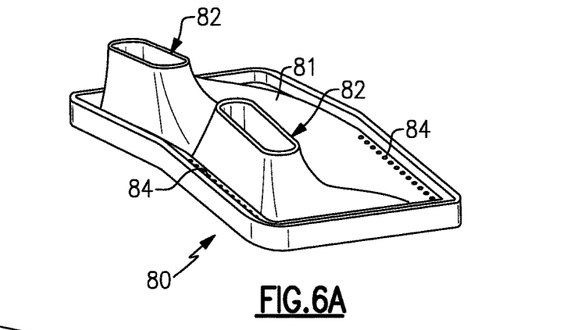
FIGS. 6A and 6B illustrates isolated views of a manifold.
Figure 6B:
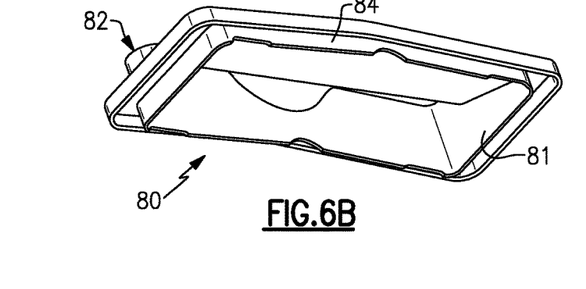

As shown in FIG. 5, a manifold 80 is disposed at least partially in the pocket 78, toward the bottom radially inner surface 76 of the pocket 78. The manifold 80 is also shown in isolated views in FIGS. 6A and 6B. For example, the manifold 80 is removably disposed at least partially in the pocket 78. As will be described in further detail below, the manifold 80 serves to receive and distribute relatively cool airflow (e.g., from the compressor section 24) to the radially inner surface 76 of the seal arc segment 66 to remove heat there from and facilitate thermal management. In this regard, the manifold 80 includes a manifold body 81 that defines at least one inlet 82 (two shown) and a plurality of outlets 84. The inlet or inlets 82 and outlets 84 are generally oriented to open radially outwards, but the manifold body 81 generally spans circumferentially and axially. As can be appreciated, although the outlets 84 are illustrated as circular orifices, elongated slots or other orifices geometries or a mixture of orifice geometries could alternatively be used.

Figure 7:
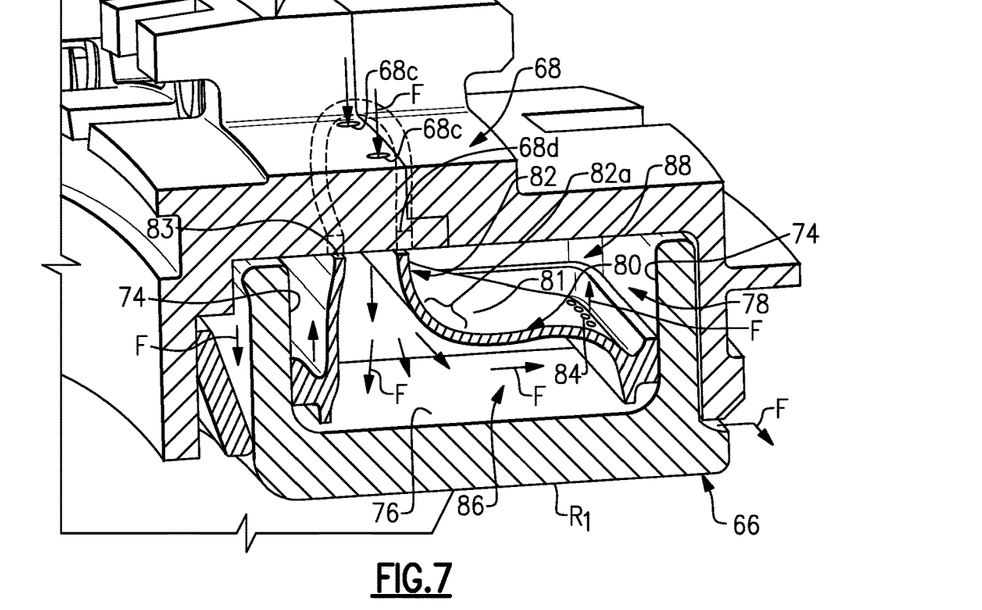
FIG. 7 illustrates a sectioned view of a seal arc segment and manifold mounted in a carriage.

FIG. 7 shows an axially sectioned view of the seal arc segment 66 and the manifold mounted in the carriage 68. In this example, the carriage 68 includes one or more supply orifices 68c that are aligned with the inlet or inlets 82 for providing the relatively cool airflow, represented at F. For instance, a lip 83 of the inlet or inlets 82 may abut the carriage 68 and circumscribe the orifices 68c. Alternatively, the lip 83 may be spaced apart from the carriage 68, but with only a relatively small gap to reduce airflow leakage. In another alternative, the carriage 68 may include a recess (shown by dashed lines at 68d) around the orifices 68c, and the lip 83 may extend into the recess 68d to provide a labyrinth seal.

The perimeter of the manifold 80 may abut or seal against the sidewalls 74 to subdivide the pocket 78 such that there is a manifold chamber 86 and a manifold exhaust chamber 88. The manifold chamber 86 is bound by the manifold 80 and the radially inner surface 76. The inlet or inlets 82 open into the manifold chamber 86, which is thus common to all such inlets 82. The manifold exhaust chamber 88 is bound, exclusive of the radially inner surface 76, by the manifold 80 and the radially-extending sidewalls 74. The manifold exhaust chamber 88 is radially outwards of the manifold chamber 86. The outlets 84 open into the manifold exhaust chamber 88, which is thus common to all such outlets 84.

The relatively cool airflow F enters the manifold 80 through the inlet or inlets 82 from the orifices 68c. In this example, the inlet or inlets 82 are flared, as represented at 82a, to distribute the airflow F through the manifold chamber 86 and over the radially inner surface 76. In this regard, the manifold body 81 may be contoured to facilitate distribution of the airflow F. The airflow F exits the manifold chamber 86 through the outlets 84 into the manifold exhaust chamber 88. The airflow F flows radially outwards, over and around the sidewalls 74, and then radially inwards along the outside of the sidewalls 74 before being discharged into the core flow path C.

The radially inner side R1 of the seal arc segment 66 is exposed to high temperatures in the core flow path C. Since the radially inner surface 76 inside the pocket 78 directly backs the radially inner side R1, the radially inner surface 76 may also be exposed to high temperatures. The manifold 80 serves to distribute the airflow F primarily over the radially inner surface 76 to cool the inner surface 76. Heat from the radially inner surface 74 can also potentially radiate to the carriage 68. The manifold 80 also serves as a barrier to block such radiant heat and facilitate and facilitate thermal management of the carriage 68.

In particular, if the seal arc segment 66 is formed of a material that has a high thermal conductivity there is the potential that the material could conduct heat into the carriage 68 and case structure 69*b*. Metallic alloys and silicon-based ceramic materials, such as silicon carbide or silicon nitride, have relatively high thermal conductivity in comparison to other non-silicon-based ceramic materials. The manifold 80 facilitates heat removal from the seal arc segment 66 to reduce exposure of the carriage 68 and case structure 69*b* to elevated temperatures. This also may reduce the need for using higher temperature-resistant materials for the carriage 68 and case structure 69*b*.

Figure 8:
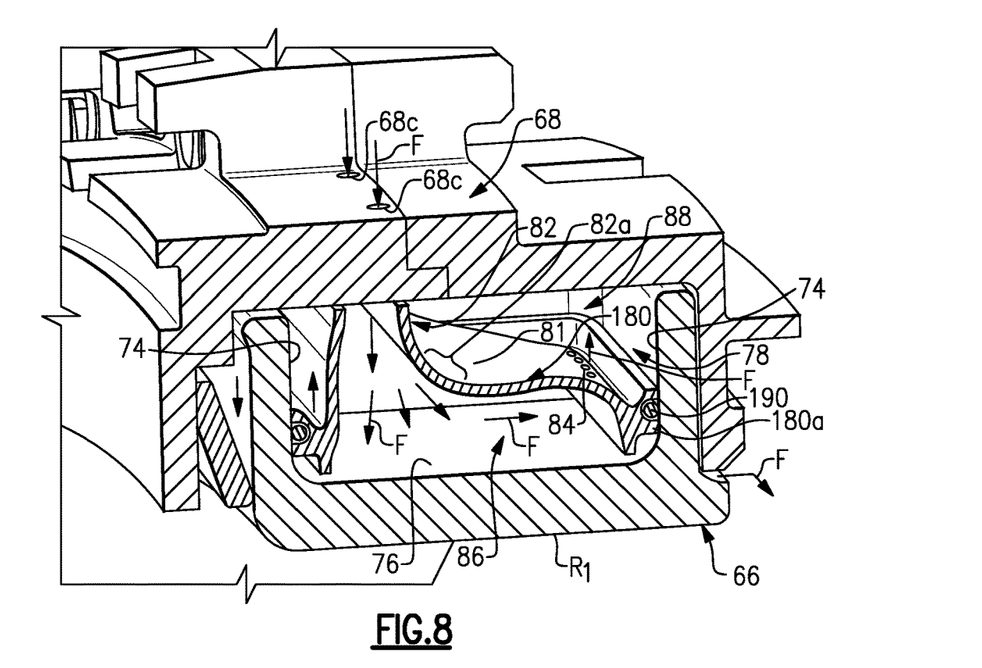
FIG. 8 illustrates another example of a seal arc segment and manifold mounted in the seal arc segment with a seal.

FIG. 8 illustrates another example of a manifold 180. The manifold 180 is similar to the manifold 80 but includes a peripheral seal groove 180*a*. For example, the seal groove 180*a* circumscribes the perimeter of the manifold 180. A seal 190 is partially disposed in the seal groove 180*a*, between the sidewalls 74 and the manifold 180 such that only the seal 190 contacts the sidewalls 74 (i.e., the manifold 180 does not contact the sidewalls 74). In this example, the seal 190 is contiguous with the radially inner surface 76. In other words, the seal 190 is immediately adjacent the radially inner surface 76. The seal 190 reduces or prevents the airflow F from leaking around the sides of the manifold 180 rather than exiting through the outlets 84. The location of the seal 109 also ensures that the manifold 180 distributes the cooling airflow F primarily to the radially inner surface 76 rather than to the sidewalls 74.

In a further example, the seal arc segment 66 is formed of a ceramic material as disclosed herein, and the manifold is formed of a metallic alloy, such as but not limited to nickel-based alloys or cobalt-based alloys. The ceramic material and the metallic alloy have different coefficients of thermal expansion. The seal 190 provides a compliant mounting of the manifold 180 in the seal arc segment 66. Although not limited, for compliance the seal 190 may be a rope seal that includes a ceramic core and an outer metal sheath. The outer metal sheath may be formed of a cobalt-based alloy. In particular, if the seal arc segment 66 is formed of a silicon-based ceramic material, the cobalt-based alloy may provide better chemical compatibility with the ceramic in comparison to nickel-based alloys, for example. Nickel tends to have a higher reactivity with silicon in comparison to the reactivity of cobalt with silicon.

Figure 9:
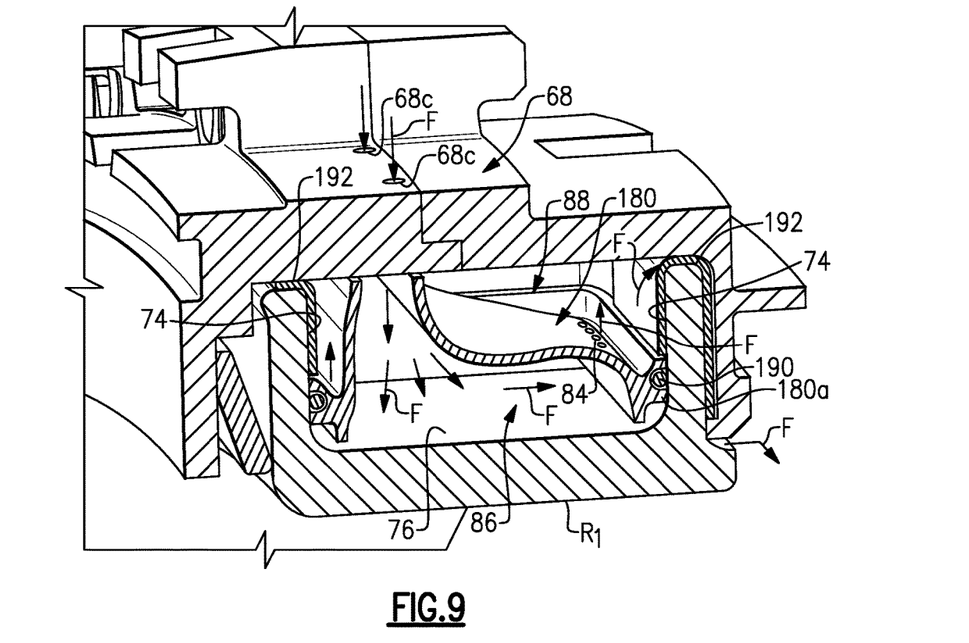
FIG. 9 illustrates another example of a seal arc segment and manifold mounted in the seal arc segment with a heat shield.

FIG. 9 illustrates another example that additionally includes a heat shield 192 that lines the sidewalls 74 of the manifold exhaust chamber 88. For example, the heat shield 192 may be brazed, welded, or otherwise affixed to the manifold 180. The outlets 84 are inboard of the heat shield 192 such that the airflow F discharged from the outlets 84 flows radially outwards along the heat shield 192 rather than along the sidewalls 74. The heat shield 192 thus thermally protects the sidewalls 74 from direct exposure to the airflow F discharged from the outlets 84. Similar to the outer metal sheath of the seal 190, the heat shield 192 may be formed of a cobalt-based alloy for enhanced chemical compatibility with silicon-based ceramic materials.

Figure 10:
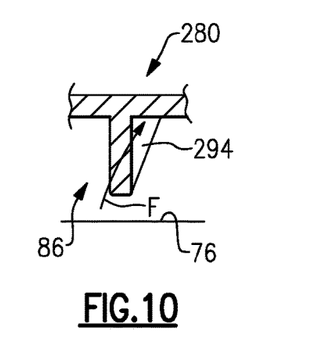
FIG. 10 illustrates an example of a manifold that has a flow guide.

FIG. 10 illustrates a representative sectioned portion of another example manifold 280, which can also be incorporated into the manifolds 80/180. In this example, the manifold 280 includes one or more flow guides 294 that protrude into the manifold chamber 86. The flow guides 294 may be pedestals, elongated ridges, airfoils, or other protrusion. The flow guides 294 serves to guide and distribute the airflow F in the manifold chamber 86. For example, computerized flow analysis may be used to estimate how the airflow F flows in the manifold chamber 86. The flow can be modified by adding flow guides 294 to promote flow to a particular area of the manifold chamber 86 that does not receive good flow, or divert flow from an area that receives more flow than desired. In this manner, the flow guides 294 can be used to achieve enhanced uniformity of flow distribution over the radially inner surface 76.

Figure 11:
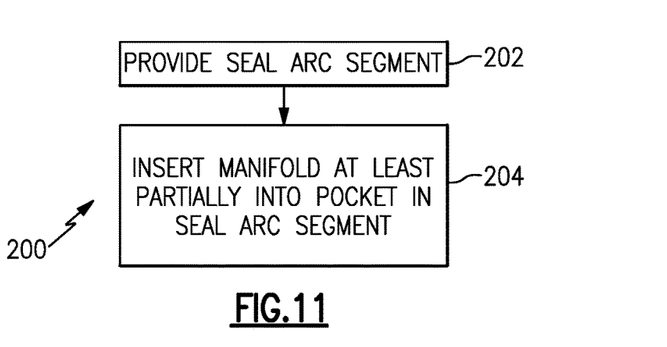
FIG. 11 illustrates an example method of assembling a blade outer air seal that has a seal arc segment and a manifold.

FIG. 11 illustrates a method 200 of assembling the BOAS 60. At 202 the method 200 includes providing the seal arc segment 66 described herein and at 204 inserting the manifold 80/180 at least partially in the pocket 78. As described, the manifold 80/180 subdivides the pocket 78 such that there is the manifold chamber 86 bounded by the manifold 80/180 and the radially inner surface 76. For example, the manifold 80/180 may be inserted in a radial direction into the pocket 78. The method 200 may also be used in a replacement or repair situation where a seal arc segment 66 that is damaged is to be replaced with a new or different seal arc segment 66. For example, the manifold 80/180 of the damaged seal arc segment 66 may be removed and then inserted into the new or different seal arc segment 66. Thus, the manifold 80/180, if not damaged itself, may be re-used with the new or different seal arc segment 66.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal assembly comprising:
   a seal arc segment defining radially inner and outer sides, the radially outer side including radially-extending sidewalls and a radially inner surface joining the radially-extending sidewalls, the radially-extending sidewalls and the radially inner surface defining a pocket;
   a manifold disposed at least partially in the pocket, the manifold subdividing the pocket such that there is a manifold chamber bounded by the manifold and the radially inner surface, the manifold including at least one inlet and a plurality of outlets;
   a seal disposed between the radially-extending sidewalls and the manifold, wherein the seal is contiguous with the radially inner surface.

2. The seal assembly as recited in claim 1, wherein the manifold subdivides the pocket into the manifold chamber and a manifold exhaust chamber that is radially outwards of the manifold chamber.

3. The seal assembly as recited in claim 2, wherein the plurality of outlets open into the manifold exhaust chamber.

4. The seal assembly as recited in claim 2, wherein the manifold exhaust chamber is bounded, exclusive of the radially inner surface, by the manifold and the radially-extending sidewalls.

5. The seal assembly as recited in claim 1, wherein the at least one inlet is flared.

6. The seal assembly as recited in claim 1, wherein the manifold includes a peripheral seal groove, and the seal is partially disposed in the peripheral seal groove.

7. The seal assembly as recited in claim 1, wherein the manifold includes at least one flow guide that protrudes into the manifold chamber.

8. The seal assembly as recited in claim 1, wherein the seal arc segment is formed of a ceramic material and the manifold is formed of a metallic alloy.

9. The seal assembly as recited in claim 1, wherein the manifold is non-destructively removable from the pocket and the seal arc segment.

10. A seal assembly comprising:
a seal arc segment defining radially inner and outer sides, the radially outer side including radially-extending sidewalls and a radially inner surface joining the radially-extending sidewalls, the radially-extending sidewalls and the radially inner surface defining a pocket;
a manifold disposed at least partially in the pocket, the manifold subdividing the pocket such that there is a manifold chamber bounded by the manifold and the radially inner surface, the manifold including at least one inlet and a plurality of outlets, wherein the manifold subdivides the pocket into the manifold chamber and a manifold exhaust chamber that is radially outwards of the manifold chamber and the manifold exhaust chamber is bounded, exclusive of the radially inner surface, by the manifold and the radially-extending sidewalls; and
a heat shield that lines the radially-extending sidewalls of the manifold exhaust chamber.

11. A gas turbine engine comprising:
a rotor section including a rotor having a plurality of blades and at least one annular seal system circumscribing the rotor, the annular seal system comprising:
a plurality of seal arc segments and a corresponding plurality of manifolds arranged with the seal arc segments, each of the seal arc segments defining radially inner and outer sides, the radially outer side including radially-extending sidewalls and a radially inner surface joining the radially-extending sidewalls, the radially-extending sidewalls and the radially inner surface defining a pocket,
the corresponding manifold being disposed at least partially in the pocket, the manifold subdividing the pocket such that there is a manifold chamber bounded by the manifold and the radially inner surface, the manifold including at least one inlet and a plurality of outlets, wherein the manifold subdivides the pocket into the manifold chamber and a manifold exhaust chamber that is radially outwards of the manifold chamber, and the plurality of outlets open into the manifold exhaust chamber, and
a heat shield that lines the radially-extending sidewalls of the manifold exhaust chamber.

12. The gas turbine engine as recited in claim 11, further comprising a seal disposed between the radially-extending sidewalls and the manifold.

13. The gas turbine engine as recited in claim 11, wherein the seal arc segment is formed of a ceramic material and the manifold is formed of a metallic alloy.

14. The gas turbine engine as recited in claim 11, wherein the manifold is non-destructively removable from the pocket and the seal arc segment.

15. A method of assembling a blade outer air seal, the method comprising:
providing a seal arc segment that defines radially inner and outer sides, the radially outer side includes radially-extending sidewalls and a radially inner surface joins the radially-extending sidewalls, the radially-extending sidewalls and the radially inner surface define a pocket; and
inserting a manifold at least partially in the pocket, the manifold subdivides the pocket such that there is a manifold chamber bounded by the manifold and the radially inner surface, the manifold includes at least one inlet and a plurality of outlets, with a seal disposed between the radially-extending sidewalls and the manifold, wherein the seal is contiguous with the radially inner surface.

16. The method as recited in claim 15, further comprising, prior to the inserting, removing the manifold from another, different seal arc segment.

* * * * *